United States Patent Office 2,972,169
Patented Feb. 21, 1961

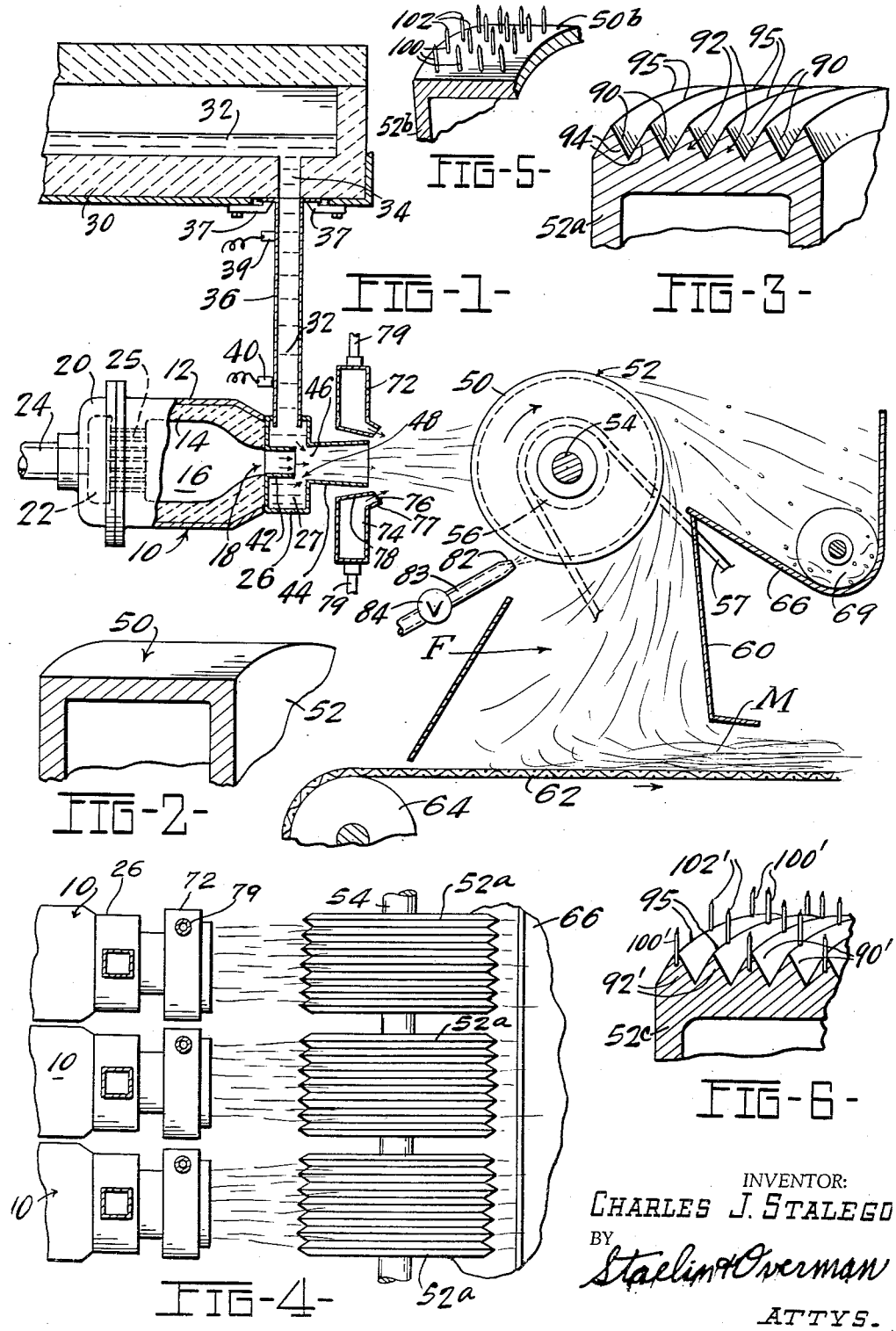

2,972,169
METHOD AND APPARATUS FOR PRODUCING FIBERS

Charles J. Stalego, Newark, Ohio, assignor to Owens-Corning Fiberglas Corporation, a corporation of Delaware Filed Sept. 13, 1957, Ser. No. 683,733

11 Claims. (Cl. 18—2.5)

This invention relates to an improved method and apparatus for producing fibers from heat-softenable, fiber-forming materials and more especially to a method and apparatus for producing fine fibers from mineral materials, such as glass, slag and fusible rock, utilizing a rotating surface and centrifugal forces for fiber attenuation.

Several methods have been employed for forming fibers utilizing centrifugal force in whole or in part as a fiber attenuating medium, but such methods have several inherent disadvantages which have limited or restricted their use because of inadequate control of temperatures and fiber sizes, high cost, and the difficulties of securing high production rates.

One method involves dropping molten glass or other mineral material onto a planar disk-like rotating surface formed with a serrated periphery, the molten glass moving outwardly thence over the serrated edges which subdivide the glass into linear bodies or fibers. This method involves difficulties in securing adequate glass flow control, lack of control of the temperature of the glass on the rotating surface and nonuniform distribution of the glass on the surface. Furthermore the fibers formed by this method are relatively coarse and therefore not suitable for many commercial purposes.

Another method which has been employed involves delivering molten glass into the interior of a hollow spinner having a peripheral wall provided with a large number of small perforations or outlets through which the molten glass is extruded or projected by centrifugal forces to form linear bodies or fibers. The linear bodies or primary fibers formed by this method may be further attenuated to finer fibers through the use of a gaseous attenuating blast directed into engagement with the centrifuged linear bodies for forming the same into finer fibers.

This method requires expensive precision equipment and particularly necessitates the use of a hollow rotor or spinner having a peripheral wall provided with a large number of small openings. The metal defining the openings is subject to continuous wear by reason of attrition of the glass projected through the openings. When the openings become too large for the formation of fibers of desired size, the spinner must be replaced. In this method, the molten glass within the spinner must be maintained at a comparatively low viscosity and hence high temperature requiring expensive high temperature resistant materials for the spinner and attendant equipment.

Another method which has been used involves dropping molten glass onto a rotating spinner whereby centrifugal forces project or direct the glass onto other spinners from which the glass is thrown outwardly by centrifugal forces at speeds sufficient to attenuate the glass to fibers. Such method is not susceptible to adequate control of the temperature of the glass during its sequential transfer onto and away from the spinners and hence this method lacks effective control over the formation of fibers or the size of fibers produced thereby.

The present invention embraces a method of forming fibers from molten glass or other mineral materials by disintegrating or atomizing a body of molten glass or other heat-softened mineral material into droplets, minute particles or globules which are impinged against a rotating surface whereby the glass on the surface is attenuated into fibers by rotative or centrifugal forces, the fibers so formed being collected in any suitable manner and the unfiberized material diverted from the fibers.

An object of the invention is the provision of a method of fiberizing molten materials by atomizing a body of the material by a gaseous blast into small droplets or particles which are impinged upon a rotating surface in a manner to cause the material of the droplets to be formed into fibers by centrifugal forces.

Another object of the invention is the provision of a method of attenuating atomized glass or other fiber-forming material by directing discrete particles thereof into engagement with a rotating surface and controlling the temperature of the rotating surface and the glass to obtain a high yield of fine fibers of substantially uniform size.

Another object of the invention is the provision of a method of forming fibers through the use of a rotatable member wherein the particles of glass are drawn to fine fibers under the influence of rotation of the surface under conditions wherein the rotating surface may operate at a comparatively low temperature without prematurely solidfying the glass whereby the glass on the surface may be formed into fine fibers.

Another object of the invention involves the steps of disintegrating a body of molten glass into comparatively fine droplets thereby fining the glass, and further fining the glass by impinging or splattering the particles of glass against a rapidly rotating surface and attenuating the glass by centrifugal forces, this method facilitating uniform distribution of glass over the rotating surface.

Another object of the invention is the provision of a method of atomizing heat-softened fiber-forming material and subjecting the atomized glass to centrifugal forces to form fibers and wherein unfiberized material is diverted from the path of traverse of the fibers.

Another object of the invention resides in the method of forming fibers by centrifugal forces wherein the amount of unfiberized material may be held to a minimum through effective control of the temperature of the glass, the distribution thereof over a rotating surface and regulation of the peripheral or linear speed of the moving surface with which the glass is engaged in converting the same to fibers.

Another object of the invention resides in an apparatus for forming fibers from heat-softenable mineral materials wherein a gaseous blast atomizes or disintegrates a molten body of glass into particles or droplets and propels or projects the particles or droplets against a rotating surface for attenuating to fibers by centrifugal forces, the apparatus including means for controlling the temperature of the body of glass and the operating temperature of the rotating surface.

Another object of the invention is the provision of a rotating surface configurated to facilitate the formation of fibers from discrete particles of glass delivered onto the surface.

Still another object is the provision of an arrangement for directing glass or other material under the influence of a high temperature gaseous blast toward a moving surface wherein the glass is disintegrated or atomized into droplets or particles impinged upon the rotating surface in conjunction with means for confining the path of traverse of the droplets or particles toward the moving surface.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic elevational view illustrating a form of apparatus for carrying out the method of the invention;

Figure 2 is a fragmentary isometric view showing one form of rotating surface or wheel forming a component of the apparatus;

Figure 3 is a fragmentary isometric view of a fiber-forming wheel illustrating a modified form of surface configuration from which the fibers are attenuated;

Figure 4 is a top plan view of the apparatus illustrating multiple fiber attenuating units embodying rotating surfaces of the character shown in Figure 3;

Figure 5 is a fragmentary isometric view illustrating another form of surface configuration of a fiber-forming wheel, and Figure 6 is a fragmentary isometric view illustrating another form of surface configuration for a fiber-forming wheel.

The method and apparatus of the invention are particularly adaptable for forming fibers from glass, but is to be understood that the method and apparatus may be used for forming fibers from other materials, such as slag, fusible rock or other heat-softenable fiber-forming material.

Referring to the drawings in detail and more particularly to Figure 1, the apparatus illustrated is inclusive of means for producing a gaseous blast suitable for atomizing or disintegrating a body or stream of heat-softened mineral material such as glass into small discrete particles, droplets or globules. The blast establishing means illustrated in Figure 1 includes a combustion burner 10 formed with a metal casing 12 of generally rectangular cross-section, the casing 12 being lined with refractory 14, the latter defining a confined zone or chamber 16 in which a combustible mixture such as fuel gas and air is adapted to be burned.

The lining of the chamber 16 is configurated to provide a restricted orifice or passage 18 in the nose end of the burner. The gases burned under confined conditions in the chamber 16 undergo great expansion and augmented by the heat reflecting characteristics of the lining which becomes heated to incandescence, the burned and burning gases are at temperatures of 2700° F. or more and are discharged through the orifice 18 as a high velocity blast of a temperature well above the attenuating temperatures of fiber forming materials such as glass, slag or fusible rock.

The burner 10 includes a member 20 formed with a manifold chamber 22 adapted to receive the combustible mixture from a supply through a tube or duct 24. The mixture flows into the combustion chamber 16 through a perforated fire screen 25.

Means is provided for establishing a body of heat-softened or molten fiber-forming material adjacent the orifice 18 whereby the gases of the blast are brought into contact with the molten fiber-forming material. Positioned adjacent the nose end of the burner 10 is a reservoir or receptacle 26 which preferably surrounds the region of the orifice 18.

Disposed above the burner 10 is a forehearth 30 of a melting furnace or tank (not shown), the forehearth containing a supply of molten glass or other flowable fiber-forming mineral material. The floor of the forehearth is provided with a passage 34 and a tube or pipe 36 in registration therewith, the tube being secured to the forehearth by clamps 37. The tube 36 extends into a chamber 27 provided by the receptacle 26 and is adapted to convey molten glass 32 into the receptacle.

The tube 36 is preferably formed of metal and is equipped with spaced terminals 39 and 40 which may be connected with a source of electrical energy for resistance heating of the glass in the tube. By regulating the current flow, the heat transmitted to the glass in the tube may be controlled so as to maintain the glass at a desired velocity. Extending into the receptacle 26 and in registration with the orifice 18 is a sleeve, tubular member or nozzle 42 assisting in the conveyance or guiding of the gases of the blast through the receptacle.

The apparatus is inclusive of an outlet or nozzle construction for the receptacle 26 arranged in respect to the blast guiding sleeve 42 whereby the gases of the blast pick up or entrain glass from the chamber 27 by reason of the aspiration or injection action of the high velocity gases. To accomplish this function, the receptacle 26 is provided with a nozzle 44 preferably tapered outwardly from the receptacle to confine the gases of the blast and the entrained glass to guide the same in a desired direction.

The entrance opening 46 of the extension or nozzle 44 is spaced from the forward edge of the sleeve 42 providing a restricted annular throat or passage 48 through which the molten glass in the receptacle 26 is subjected to the forces of the blast. The gases of the blast moving at high velocities cause an aspirating or injecting action on the glass at the throat 48, drawing the glass through the throat and disintegrating or atomizing the mobile glass entrained by the blast into discrete particles, droplets or globules.

The stream of gases conveys and directs the discrete particles, droplets or globules of glass toward a moving surface 50, the latter arranged to traverse a curvilinear path. In the embodiment illustrated, the moving surface 50 is the peripheral region of a circular, cylindrically-shaped rotor, drum or wheel 52 which is preferably of hollow configuration as illustrated in Figure 2 and is mounted upon a shaft 54 journalled for rotation upon suitable bearings (not shown). The drum 52 may be rotated by means of a pulley 56 and a belt 57 driven by a suitable motor (not shown).

The rotor 52 is preferably rotated at a peripheral speed of ten thousand or more linear feet per minute. The speed of rotation of the drum 52 is regulated or controlled by varying the speed of the operating motor or by a variable speed mechanism (not shown) connected with the motor. The high velocities of the gases project or impinge the discrete particles, globules or droplets of glass against the moving surface 50 in a direction substantially normal to the axis of the rotor, viz., in a direction normal to a plane tangent with the curvilinear surface at the region of impingement of the material with the surface.

Disposed adjacent the drum or rotor 52 and at a region spaced from the zone of impingement of the material against the surface is a walled hood or chamber 60 which directs attenuated fibers thrown from the moving surface 50 onto a flight 62 of a conveyor belt disposed beneath the hood 60. The conveyor belt is supported by suitable rollers, one of which is shown at 64 in Figure 1, the belt being driven whereby the flight 62 moves continuously in a right-hand direction to convey the mass of accumulated fibers M from the hood 60 for further processing.

Arranged adjacent the hood 60 is a member 66 forming a chute or trough which is adapted to receive unfiberized material in the form of small pellets or shot which may be thrown from the rotating surface 50. A screw conveyor 69 is disposed adjacent the chute 66 and is adapted to convey unfiberized material away from the chute. The blast of gases conveys the particles or globules of glass into contact with the surface 50 with sufficient inertia or force to cause the globules or droplets to spread or splatter over the surface 50 so that there is a substantially equal distribution of glass throughout the width of the surface 50 of the drum 52. As the surface 50 is rotating at high speed, minute portions of the glass leave the surface and draw out or attenuate to long fine fibers of varying lengths under the influence of rotative or centrifugal forces. Substantially all of the material impinged against the surface 50 is formed or converted into fine fibers F which follow the general contour or curvature of the surface 50 throughout a substantial distance peripherally of the surface, this distance being dependent upon various factors including the temperature and hence viscosity of the glass and the peripheral speed of the rotor 52. By regulating the viscosity of the glass moving through the resistance heated tube 36 and by regulating the speed of rotation of the surface 50, the zone at which the fibers leave the surface of the wheel may be determined, and the fibers directed into the hood 60. While the process is highly efficient in producing fine attenuated fibers, a minor amount of the material may be unfiberized and exists in the form of pellets and shot. Due to the mass of the glass which is projected onto the rotor, pellets form as the glass leaves the rotor in initiating fiberization.

The pellets are thrown outward and broken off and discharged at a region in advance of the zone at which the attenuated fibers leave the rotor.

Additional means may be provided for confining the gases of the atomizing blast and the stream of particles or droplets of molten material in their traverse toward the rotating surface 50. In the embodiment illustrated in Figure 1, this means may be in the form of additional blasts or streams of fluid directed along the boundaries of the atomizing blast. Disposed adjacent and surrounding the nozzle construction 44 is a hollow member or burner 72 providing a combustion chamber 74. The member 72 is fashioned with an outlet or orifice 76 surrounding the atomizing blast from the orifice 18, the walls 77 and 78 defining the outlet 76 being angularly arranged with respect to the axis of the atomizing blast. A combustible mixture conveyed by tubes 79 into the chamber is burned therein and the hot products of combustion discharged through the orifice 76 as a secondary blast confining the atomizing blast and mobilized droplets or particles of material.

A fluid such as steam or air may be employed for the secondary blast, the steam or air under pressure being conveyed from a source through tubes 79 into the chamber 74 for discharge through orifice 76. The blast confining medium resists expansion of the gases and hence aids in maintaining a high velocity for the atomizing blast and restricts the area peripherally of the surface 50 in which the droplets or particles engage the surface.

The arrangement includes means for controlling the temperature of the peripheral region of the rotor 52. Disposed adjacent the surface 50 and in advance of the region of impingement of the atomized glass against the surface is a nozzle 82 carried by a tube 83, the latter being provided with a regulating or control valve 84. The nozzle 82 is adapted to discharge or deliver a temperature controlling medium adjacent or in contact with the moving surface 50. The hot gases of the blast and the molten glass continuously engaging the surface 50 tend to elevate the temperature of the rotor.

Under these conditions of operation, it is desirable to direct a cooling medium, such as a stream of air, steam or water against the surface 50 to reduce or control the temperature of the rotor. The valve 84 may be regulated to control the amount of temperature controlling fluid delivered adjacent the surface 50. By controlling the temperature of the moving surface, the fibers are of more uniform size and the life of the rotor prolonged.

The method of the invention performed through the use of the above described apparatus is as follows: A heat-softened fiber-forming material, such as glass, is contained in the forehearth 30 and flows from the forehearth through passage 34 and tube 36 into the reservoir or chamber provided by the member 26.

The glass in the tube 36 is maintained at a proper temperature and hence proper viscosity through heat generated by the resistance to the passage of electrical energy supplied to the terminals 39 and 40. The combustible mixture is introduced into the manifold 22 and flows through the passages in the fire screen 25 into the combustion chamber or zone 16 in which the mixture is substantially completely burned.

The burned gases at temperatures well in excess of the attenuating temperature of the glass or other fiber-forming material are discharged through the orifice 18 and sleeve or nozzle 42 into the nozzle member 44. As the gases of the blast moving at high velocities flow past the throat 46, molten glass from the reservoir or receptacle 26 is induced into and entrained by the blast through aspiration or injection. The glass engaged by the gaseous blast is atomized or disintegrated thereby in and adjacent nozzle 44 into globules, droplets or small discrete particles which are projected or conveyed by the blast at high velocities through the air adjacent the surface 50 and into impinging engagement with the rotating surface.

Under the influence of the rotative and centrifugal forces set up by the high speed rotation of the rotor or drum 52, the glass on the surface 50 is attenuated to fibers which, when discharged from the region adjacent the rotor, pass through the hood 60 and are collected and accumulated upon the conveyor 62. The unfiberized material in the form of shot or pellets, is collected in a chute provided by member 66 and conveyed away from the chute by a screw conveyor 69 or other suitable means. The temperature of the surface region of the drum or wheel 52 is controlled by a fluid medium delivered from the nozzle 82, the amount of fluid being controlled by manipulation of the valve 84.

Numerous advantages are derived through the utilization of the method of this invention. The step of atomizing or disintegrating the body of molten glass or other fiber-forming material into particles, droplets or globules, effects a fining of the glass, and a further fining of the glass ensues by the impinging or splattering of the atomized glass against the surface 50 of the rotating drum. Through this action, the material of the particles, droplets or globules is rendered more homogeneous, a factor which fosters attenuation of the material into longer and finer fibers. Furthermore, the method of impinging the atomized glass against the rotating surface by means of a high velocity blast obtains improved glass distribution over the surface and increased efficiency of attenuation with a consequent low percentage of shot or unfiberized material.

Figure 3 illustrates a modified form of rotor or drum for forming fibers according to the method hereinbefore described. The peripheral region of rotor or drum 52a is configurated with circumferential recesses or grooves 90 which form peripheral ridges 92 which are preferably of triangularly shaped cross-section as shown in Figure 3.

In the operation of the apparatus utilizing a rotating member 52a against which the atomized glass or other material is impinged under the influence of a gaseous blast, the droplets, globules or particles of molten or flowable glass engaging surfaces 94 defining the ridges 92 flow outwardly to the apices 95 of the ridges 92 under the influence of centrifugal forces of rotation of the member 52a. The material at the apices leaves the rotor under the influence of rotative or centrifugal forces and is drawn into fine fibers.

In the utilization of a peripherally recessed or grooved wheel 52a, a greater peripheral surface area is presented subject to the cooling effect of the ambient air. In order to prevent overcooling of the rotor surface, it may be desirable to direct a flame against the surface of the wheel. This may be accomplished by delivering a combustible mixture from the nozzle 82 shown in Figure 1 and igniting the combustible mixture and directing the flame adjacent the peripheral surface of the rotor.

It is to be understood that the method embraces the utilization of temperature controlling fluid or means for increasing or reducing the temperature of the rotor as the operating temperature thereof may vary widely depending upon the surface configuration of the rotor, the temperature of the fiber-forming material and the linear peripheral speed of the rotor.

Figure 4 illustrates a plurality of burners or blast establishing units 10, each equipped with a glass receiving reservoir 26 from which the glass is atomized and directed by the high temperature, high velocity blast into engagement with a plurality of grooved wheels 52a. It is to be understood that other forms of rotor disclosed herein may be utilized in multiple units in the manner shown in Figure 4. The arrangement shown in Figure 4 is advantageous where a fibrous mat of substantial width is to be formed as fiber attenuation may be carried on throughout a transverse region approximately equal to the width of the mat through the use of a requisite number of rotating drums and material atomizing blasts.

Figure 5 illustrates a modified form of rotor or drum construction. The rotor 52b is formed with a circular cylindrical surface 50b. Projecting radially or outwardly from the surface 50b is a comparatively large number of projections or pins 100 preferably formed with pointed or cone shaped extremities 102. In the operation of the method utilizing the rotor 52b in lieu of the rotor 50, the particles, globules or droplets of glass impinging upon the surface 50b are moved outwardly along the surfaces of the pins 100 under the influence of centrifugal forces. The glass at the tips 102 of the pins is attenuated to fine fibers by rotative and centrifugal forces acting upon the material.

Figure 6 illustrates a rotor or drum having a peripheral region formed with ridges and outwardly extending pins. The rotor or drum 52c shown in Figure 6 has its peripheral region formed with ridges 92' of triangular cross-section which terminate in curvilinear apices 95 extending around the rotor. Mounted upon and circumferentially spaced on the linear ridges 95 are outwardly extending pins 100' having tapered or cone shaped extremities 102'. During the operation of the method utilizing the rotor construction shown in Figure 6, the glass engaging the peripheral surface regions 90' of the ridges 92' moves outwardly under the influence of centrifugal forces to the curvilinear regions 95 and radially along the pins 100' toward the tips 102' of the pins. Under the influence of centrifugal forces, the glass leaves the curvilinear regions 95 and the tapered end regions 102' of the pins and is drawn or attenuated to fine fibers.

When the rotor or wheel constructions illustrated in Figures 3, 5 and 6 are utilized in the arrangement shown in Figure 1, the nozzle or nozzles 82 may be utilized to deliver combustible mixture which, as hereinbefore mentioned, is ignited and burns adjacent the peripheral region of the wheel to control the temperature of the wheel.

Irrespective of the form of rotor, drum or wheel employed in the centrifugal formation of fibers, the same is operated at a temperature substantially less than that of the molten fiber-forming material. This arrangement, providing for temperature control of the rotor, greatly prolongs the life of the rotor and finer fibers of more uniform character are produced as the operating temperature of the rotor has a direct bearing upon the extent and character of attenuation of the material.

While the apparatus shown in Figure 1 includes means for establishing a blast of a temperature above the attenuating temperature of the glass or other fiber-forming mineral material, it is to be understood that a blast of lower temperature, such as a steam or air blast, may be utilized for disintegrating or atomizing the molten fiber-forming material and delivering the disintegrated or atomized material into engagement with the fiber attenuating drum or rotor. When low temperature blasts are employed the glass delivered into the atomizing blasts is maintained at a lower viscosity and the temperature of the attenuating wheel controlled so as to maintain the particles, droplets or globules in an attenuable state or condition at the surface region of the wheel.

If additional heat is desired at the region of movement of the atomized or disintegrated material toward the surface of the attenuating rotor, the gas streams or blasts projected from the chamber 74 formed by member 72 may be heated or the streams or blasts therefrom formed by burning combustible mixture in the chamber 74 and discharging the hot burned or burning gases through the orifice 76.

It will be apparent from the foregoing that the method of the invention provides for accurate control of the factors of glass viscosity, extent of atomization or disintegration of the molten glass, control over the temperature of the attenuating rotor, and the linear speed thereof whereby fibers of uniform size and character may be produced economically in large quantities on a commercial scale. Furthermore, the apparatus occupies a comparatively small space whereby multiple fiber-forming units may be utilized efficiently in adjacent side-by-side relation as shown in Figure 4.

It is apparent that, within the scope of the invention, modifications and different arrangements may be made other than is herein disclosed, and the present disclosure is illustrative merely, the invention comprehending all variations thereof.

I claim:

1. The method of forming fibers from heat-softened mineral material including establishing a high velocity gaseous blast, directing the blast through a body of heat-softened mineral material whereby the material is entrained in the blast by aspiration, disintegrating the heat-softened mineral material into discrete bodies by the velocity of the gases of the blast, projecting the bodies of material by the gases of the blast into impinging engagement with a surface, and rotating the surface at a speed whereby the material on the surface is converted into fibers by centrifugal forces.

2. The method of forming fibers from heat-softened material including establishing a gaseous blast, delivering heat-softened material into the blast whereby the material is entrained through aspiration by the gases of the blast, conveying the material by the gases of the blast into engagement with a surface, and rotating the surface at a speed whereby the material on the surface is converted into fibers by centrifugal forces, and directing a heat transferring medium into the region of the rotating surface to regulate the temperature of the surface.

3. The method of forming fine fibers from mineral materials including burning a combustible mixture in a confined zone and discharging the burned gases through a restricted orifice, delivering heat-softened mineral material into a region adjacent the orifice, directing the gases discharged through the orifice and through and in contact with the mineral material adjacent the orifice to atomize the material and propel the atomized material against a surface, rotating the surface at high peripheral speed whereby the material on the surface is attenuated to fibers by centrifugal forces regulating the speed of rotation of the surface to control the region of discharge of the attenuated fibers from the surface, directing a fluid into contact with the surface for controlling the temperature thereof, and collecting unfiberized particles thrown outwardly from the surface at a region spaced from the region of discharge of fibers from the surface.

4. The method of forming fine fibers from heat-softenable material including directing a high velocity gaseous blast toward a surface, moving the surface in a curvilinear path, moving the gases of the blast through a body of the heat-softened material whereby the material is mobilized through aspiration by the blast and disintegrated into globules, confining the path of the gases of the blast and mobilized globules, conveying the globules into impinging engagement with the moving surface by the velocity of the gases, and attenuating the material on the surface to fibers by forces set up by the moving surface.

5. Apparatus of the character disclosed, in combination, means for establishing a high velocity gaseous blast, a reservoir adapted to contain heat-softened fiber-forming material, means providing a passage for the blast through the reservoir arranged whereby the gases of the blast aspirate material from the reservoir into the blast, a rotor having a surface disposed in the path of the blast to receive the material entrained in the blast, and means for rotating the rotor at a speed whereby centrifugal forces attenuate the material on the rotor surface to fibers.

6. Apparatus of the character disclosed, in combination, means for establishing a high velocity gaseous blast, a reservoir adapted to contain heat-softened fiber forming material, a hollow member projecting into the reservoir arranged to convey the gases of the blast through the reservoir, a nozzle connected with the reservoir providing a passage for the blast arranged whereby the gases of the blast contact and aspirate the heat-softened material in the reservoir into the blast, a rotor having a surface disposed in the path of the blast and arranged to receive the material entrained in the blast, means for controlling the viscosity of the material contained in the reservoir, means for rotating the rotor at a speed whereby centrifugal forces attenuate the material on the rotor surface to fibers, and means for directing a fluid medium adjacent the peripheral surface of the rotor for controlling the temperature thereof.

7. Apparatus of the character disclosed, in combination, a receptacle adapted to contain a supply of heat-softened mineral material, a combustion burner adapted to burn a combustible mixture under confined conditions, said burner being formed with a restricted orifice through which the burned gases are projected as a high velocity blast, a reservoir adjacent the orifice, means for conveying mineral material from the supply into the reservoir, means for applying heat to the material to control the viscosity of the material in the reservoir, means for directing the gases of the blast through and in contact with the material in the reservoir whereby the material is entrained in the blast and disintegrated thereby into discrete bodies, a rotor having a peripheral surface disposed in the path of the blast and arranged to receive the discrete bodies impinged upon the surface by the blast, and means for rotating the rotor whereby centrifugal forces attenuate the material on the rotor surface to fibers.

8. Apparatus of the character disclosed, in combination, means containing a supply of heat-softened mineral material, means for establishing a high velocity gaseous blast, a reservoir, means associated with the reservoir for directing the gaseous blast therethrough, a duct adapted to convey material from the supply to the reservoir, a rotor having a peripheral surface region arranged in the path of the blast, said blast being directed toward said peripheral surface and arranged to entrain mineral material from the reservoir by aspiration and disintegrate the entrained material into discrete bodies and convey the bodies to the peripheral surface, means for establishing a gas stream directed along the blast for confining the blast and the discrete bodies entrained therein, and means for rotating the rotor at a speed whereby the mineral material on the surface of the rotor is converted to fine fibers by centrifugal forces.

9. Apparatus of the character disclosed, in combination, means for establishing a high velocity gaseous blast, a reservoir adapted to contain heat-softened mineral material, means for conveying the gaseous blast through and in contact with the material in the reservoir whereby said blast entrains by aspiration material from the reservoir, a rotor having a peripheral surface disposed in the path of said blast, the peripheral surface of the rotor being formed with outwardly extending projections, said peripheral surface region of the rotor being adapted to receive the material entrained in the blast, and means for rotating the rotor at a speed whereby centrifugal forces discharge the material on the rotor outwardly from the projections and attenuate the material to fibers.

10. Apparatus of the character disclosed, in combination, means for establishing a high velocity gaseous blast, a reservoir adapted to contain heat-softened mineral material, means for conveying the gaseous blast through and in contact with the material in the reservoir whereby said blast entrains by aspiration material from the reservoir, a rotor having a peripheral surface disposed in the path of the blast and material entrained therein and adapted to receive the material, said rotor being formed with a plurality of circumferential ridges, and means for rotating the rotor at a speed sufficient to discharge material on said rotor surface outwardly from said ridges and attenuate the same to fibers by centrifugal forces.

11. Apparatus of the character disclosed, in combination, means for establishing a high velocity gaseous blast, a reservoir adapted to contain heat-softened mineral material, means for conveying the gaseous blast through and in contact with the material in the reservoir whereby said blast entrains by aspiration material from the reservoir, a rotor having a peripheral region arranged in the path of the blast and adapted to receive the entrained material on said surface region, said surface region being formed with a plurality of transversely spaced circumferential ridges, a plurality of outwardly extending circumferentially spaced pins carried by the rotor, and means for rotating the rotor whereby centrifugal forces discharge the material from said ridges and pins and attenuate the material to fibers.

References Cited in the file of this patent

UNITED STATES PATENTS

| 1,718,334 | Crowley et al. | June 25, 1929 |
| 1,950,932 | Schott | Mar. 13, 1934 |
| 2,018,478 | Whittier | Oct. 22, 1935 |
| 2,156,316 | Slayter et al. | May 2, 1939 |
| 2,192,944 | Thomas | Mar. 12, 1940 |
| 2,274,130 | Davis | Feb. 24, 1942 |
| 2,297,726 | Stephanoff | Oct. 6, 1942 |
| 2,318,244 | McClure | May 4, 1943 |
| 2,578,100 | Stalego | Dec. 11, 1951 |
| 2,578,101 | Stalego | Dec. 11, 1951 |
| 2,605,503 | Powell | Aug. 5, 1952 |
| 2,758,335 | Overman | Aug. 14, 1956 |

FOREIGN PATENTS

| 149,397 | Australia | Dec. 11, 1952 |
| 531,514 | Canada | Oct. 9, 1956 |
| 245,322 | Switzerland | July 1, 1947 |